Feb. 25, 1964　　　　C. F. MORAIN　　　　3,121,898
APPARATUS FOR PREPARING COATED AND WRAPPED PIPE FOR JOINING
Filed Aug. 15, 1962　　　　　　　　　　2 Sheets-Sheet 1
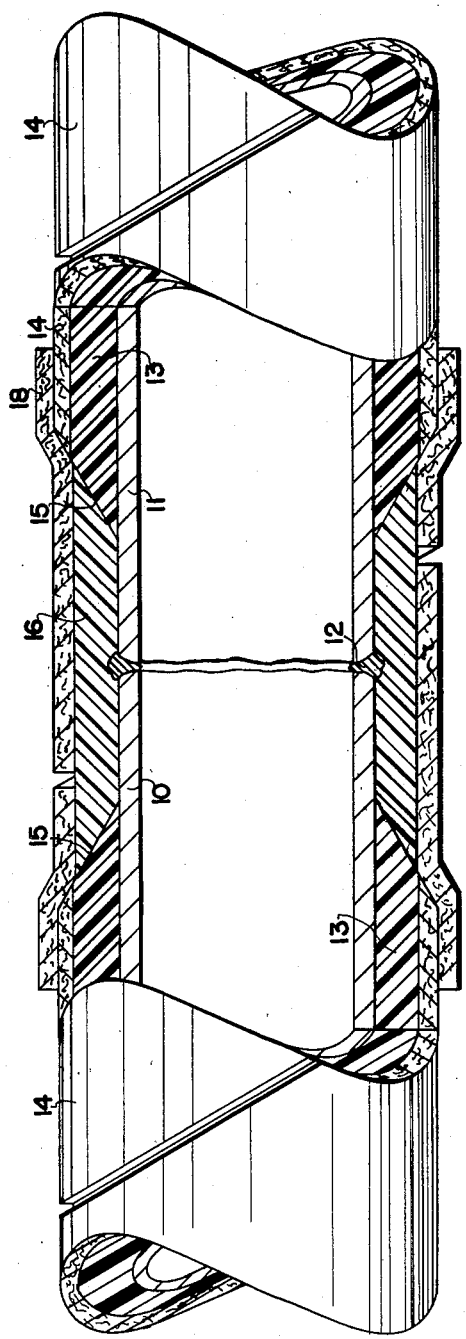
INVENTOR.
CLIFFORD F. MORAIN
BY
*Francis J. Klempay*
ATTORNEY Feb. 25, 1964    C. F. MORAIN    3,121,898
APPARATUS FOR PREPARING COATED AND WRAPPED PIPE FOR JOINING
Filed Aug. 15, 1962    2 Sheets-Sheet 2

INVENTOR.
CLIFFORD F. MORAIN
BY
Francis J. Klempay
ATTORNEY

United States Patent Office 3,121,898
Patented Feb. 25, 1964

3,121,898
APPARATUS FOR PREPARING COATED AND WRAPPED PIPE FOR JOINING
Clifford F. Morain, Burgett Road, Youngstown, Ohio
Filed Aug. 15, 1962, Ser. No. 217,028
5 Claims. (Cl. 15—88)

This invention relates to the pipe-line industry, and more particularly to apparatus for preparing coated and wrapped pipe for joining either by mechanical couplings or welding. It is now universal practice to coat and wrap in a central plant discrete pipe lengths which are to make up a pipe-line for gas, oil and other outlets. In the coating and wrapping process it is common desirable practice to temporarily join these discrete lengths in end-to-end relation, and thus pass a continuous length of the stock through the coating and wrapping equipment for a maximum rate of production. At the outlet end of the coating and wrapping equipment the coating and wrapping on the pipe is cut off squarely at the joints and, of course, any temporary joining plugs are removed.

The product produced as above described has its wrapping and coating extended to the full ends of the discrete lengths, and if these lengths are to be stored under adverse conditions for any appreciable length of time it is desirable to keep the coating and wrapping on all of the exterior surface of the pipe lengths up to the time of use. To enable the pipe lengths to be joined in end-to-end relation either by welding or by the use of mechanical couplings, including threaded couplings, it is necessary, however, that the end portions of the pipe lengths be bared to present a clean bright surface for welding and more particularly for application of any mechanical couplings used. This baring of the end portions of the pipe lengths is commonly done in the field although if the point of use is near the coating and wrapping plant it may be done in such plant. In actual practice the combined coating and wrapping is usually about one-fourth inch thick and is quite tough and adhesive, and heretofore the end portions of the pipe lengths have been bared by cutting through this combined coating and wrapping with a revolving knife or disc cutter to make circumferential slits in the combined coating and wrapping down to the metal of the pipe and in planes which are normal to the principal axes of the pipe lengths. Thereafter the parted cylindrical end sections are slid or peeled off the end portions of the pipe.

The above method of preparing the end portions of the pipe lengths has the disadvantage that the sharp shoulders thus formed on the pipe by the ends of the coatings make it difficult to patch-in coatings and wrappings at the joints and, further, does not fully clean the end portions of the pipe lengths—making it difficult to install any mechanical type of couplings and, in some cases, also contaminating the welding process. It is accordingly the primary object of my invention to obviate these objections and to provide improved apparatus for accomplishing this task of baring the end portions of the pipe lengths.

A secondary object of the invention is the provision of simplified apparatus for accomplishing the task above described which may be readily used either in the field or in a central plant, as desired. A further object of the invention is to so skive down the combined cutting and wrapping of the pipe toward the ends thereof so that a larger area of effective bond may be established between the original materials and the material used for the patches about the joints made in the pipe line whereby improved waterproofing is obtained.

The above and other objects and advantages of the invention will become apparent upon consideration of the following specification and the accompanying drawing wherein there is disclosed preferred embodiments of the invention.

In the drawing:

FIGURE 1 is a sectional view of a joint made between two lengths of coated and wrapped pipe in which the end portions of the lengths were prepared in accordance with the principles of my invention;

FIGURE 2 is a side view of an end portion of a coated and wrapped pipe length which has been prepared for joining by methods heretofore used in the art;

Figure 3:
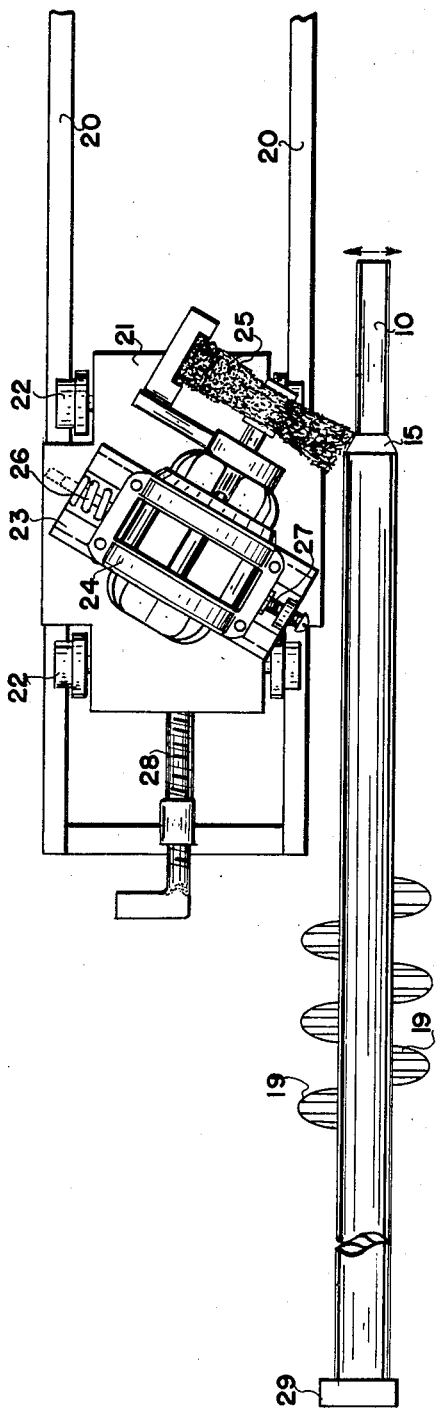
FIGURE 3 is a plan view of apparatus constructed in accordance with my invention and for carrying out the method of my invention.

Referring first to FIGURE 1 reference numerals 10 and 11 designate the adjacent end portions of pipe lengths which have been joined in end-to-end relation by a peripheral weld bead 12 formed in the annular interstice between the lengths 10 and 11. Reference numeral 13 designates, on an exaggerated scale, a coating material which was initially applied to the pipe lengths before the application of the wrapping material 14. The latter which may be very heavy craft paper is commonly applied in a spiral pattern as indicated. It should be understood that the coating and wrapping illustrated is by way of example only since different manufacturers and users of the product have varying specifications of methods and structure for providing the exterior protection on the pipe. Commonly, the protection may consist of a plurality of spiral wrappings between successive applications of asphaltic or bituminous substances which are applied in a heated condition. My invention is applicable to any of these variations and, as will appear later, the apparatus proposed herein is capable of cutting away any of the combined coatings and effectively baring and cleaning the end portions of the pipe lengths underneath these coatings and/or coatings and wrappings.

The most important feature of my invention is that in baring the end portions of the pipe lengths the resulting end surfaces of the combined coating and wrapping on the pipe lengths be skived down or tapered as shown at 15. By so doing, the volume 16 of protective coating material which is subsequently applied over the bared end portions of the pipe lengths (after joining of the lengths) will have a much larger area of contact with the skived portions or tapers 15 of the parent coating 13 to thereby provide a more continuous bond of this material longitudinally along the pipe line. If this volume contains additional interspersed wrappings as suggested above the application of the wrappings is facilitated due to the easy angles between the peripheral cylindrical surface of the patch coatings and the tapered surfaces 15. This can be readily appreciated upon consideration of FIGURE 2 wherein the sharp shoulder 17 makes it difficult not only to bond the coatings in a continuous longitudinal direction but also to apply the interspersed patch wrappings. Finally, this tapering 15 which extends to the outer periphery of the outermost wrapping 14 of the pipe lengths facilitates the application of the outermost patch wrap 18, all as shown in FIGURE 1. Since the paper of any of the wraps does not engage on any sharp corners there is less chance of rupturing the wrap and of applying the same in such manner that air spaces are entrapped from which moisture could spread to shorten the life of the pipe protection.

Figure 4:
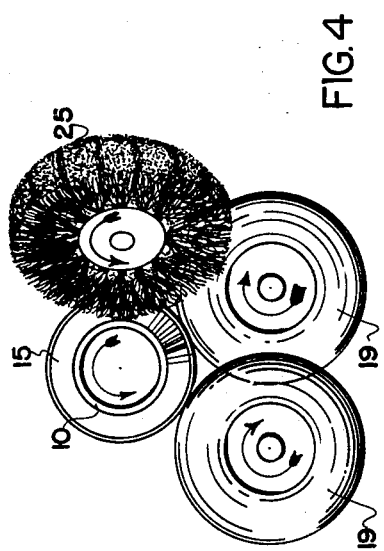
FIGURE 4 is a fragmentary end view of the apparatus of FIGURE 3.

Referring now to the apparatus illustrated in FIGURES 3 and 4 which is provided for the purpose of baring the ends of the pipe lengths and forming the tapers 15 in the outer protective coating and wrapping reference numeral 19 indicates a few of a longitudinal series of nested rubber-tired rolls which are operative to support and rotate a pipe length as shown in FIGURE 4. Suitable drive means, not shown, is provided to rotate the rolls 19 at proper speed, and in some installations where lightweight pipe may be processed suitable hold down rolls, also not shown, may be provided. In any event the function of the apparatus thus far described is to support and rotate a pipe length about a generally fixed longitudinal axis. Installed parallel with such axis are rails 20 to provide a track for the longitudinal movement of a carriage 21. In actual practice, the carriage 21 is supported on the track by flanged wheels 22 and the fit between these wheels and the rails 20 is such that the carriage is accurately guided for movement parallel with the axis of the pipe supported on rolls 19.

Mounted on the carriage 21 is a base 23 having ways therein to slideably mount and guide a motor 24. Mounted on the protruding end of the shaft of motor 24 is a wire brush 25 having such diameter in relation to the outer diameter of the metal pipe being worked on that the outermost edge of the brush will have wiping contact with the exterior surface of the metal pipe as the carriage 21 moves from an inoperative position (to the right of that shown in FIGURE 3) to operating position shown. Note that the direction of the ways in base 23 is angularly related to any plane normal to the axis of the pipe being worked on so that at the end of a stripping cycle the resultant end wall of the coating and wrapping on the metal pipe will be tapered as shown at 15 by the peripheral cylindrical surface of the wire brush 25.

To insure that the outer corner or edge of the brush 25 engages the metal of the pipe length 10 with sufficient force to thoroughly clean the same and to compensate for any wobble which may appear in the pipe length being worked on the motor 24 and consequently the brush 25 is yieldingly urged toward the pipe length by a spring 26. An adjustable stop 27 is provided on the base 23 to limit such inward movement of the motor so that at the start of the cycle of operation the brush 25 will readily climb up onto the end of the pipe length 10. To determine the length of the bared portion of the pipe length I provide an adjustable stop 28 which limits the longitudinal movement of the carriage 21 along the pipe length being worked on. A retractable stop 29, which again may be adjustable, is provided to resist the rearward movement of the pipe length being worked on as the forward end of the same is being traversed by the wire brush 25.

It should now be apparent that I have provided an improved apparatus for baring the end portions of protected metal pipe lengths which accomplishes the objects initially set out above. Primarily the improvement resides in the fact that the resultant end surfaces of the protecting outer layer of the pipe lengths are steeply tapered inwardly toward the adjacent ends of the metal pipe lengths. This greatly facilitates and improves on any patching protective thicknesses which may be applied in the field over the couplings or welds during the construction of a pipe line, with all the attendant advantages outlined above, whatever the details of the patches. The use of the wire brush not only automatically accomplishes this tapering but it also does a more complete cleaning action on the bared portion of the metal pipe to make for cleaner welding conditions and for the easier application in the field of mechanical coupling members, if used. The apparatus required is simple in design and construction and is readily portable for use in the field, if desired. Also, the yieldable mounting of the brush is advantageous in that any wobble in the rotating pipe length being worked on as may result from a bend in the length is automatically compensated for so that the whole peripheral extent of the end portion of the metal pipe is properly outlined.

While I have and described wire brush apparatus as the preferred equipment for carrying out the method of my invention—i.e. the skiving down or tapering of the coating and wrapping thickness of the protected pipe inwardly of the ends of lengths thereof—it should be understood that various other instrumentalities such as angularly disposed knives, for example, may be employed for this purpose. Therefore, since various changes may be made in the details of construction of the apparatus herein shown for carrying out the method of my invention without departing from the spirit or scope of the invention, reference should be had to the appended claims in determining the scope of the invention.

I claim:

1. Apparatus for preparing the end portions of coated and wrapped lengths of metal pipe for end-to-end joining comprising means to support and rotate a length of said pipe about its longitudinal axis, a rotatable wire brush mounted for rotation about an axis angularly disposed with respect to said axis of said length, said brush being so located with respect to said axis that the outer periphery of the brush may engage the metal of the pipe length while forming a tapered end surface on the coating and wrapping on the pipe length, means to drive said brush, and means to effect relative longitudinal movement between said brush and the end portion of said length to remove the coating and wrapping from a part of said end portion while forming said tapered end surface on the remaining coating and wrapping portion of said length.

2. Apparatus according to claim 1 further characterized in that said means to effect relative longitudinal movement comprises a longitudinally movable carriage mounting said brush and said means to drive said brush, said last mentioned mounting means including means to yieldably urge said brush into contact with said length.

3. Apparatus according to claim 2 further including an adjustable stop to limit the inward movement of said brush in a direction toward said longitudinal axis of said length.

4. Apparatus according to claim 2 further including a stop to limit longitudinal movement of said length in the direction in which said carriage moves during cutting action of said brush.

5. Apparatus according to claim 4 further including an adjustable stop to limit the longitudinal movement of said carriage in a cutting direction, the arrangement being such that the length of metal stock thereby bared in the end portion of said length is predetermined.

References Cited in the file of this patent

UNITED STATES PATENTS

| | | |
|---|---|---|
| 1,910,642 | Sherrard | May 23, 1933 |
| 2,031,057 | Mitchell | Feb. 18, 1936 |
| 2,444,075 | Violette | June 29, 1948 |
| 2,463,231 | Wyatt | Mar. 1, 1949 |
| 2,888,694 | Betzel | June 2, 1959 |
| 3,050,757 | Dodge | Aug. 28, 1962 |